(12) United States Patent
Cheng

(10) Patent No.: US 9,395,044 B2
(45) Date of Patent: Jul. 19, 2016

(54) WALL HANGER

(71) Applicant: Cheng-Ge Cheng, Taipei (TW)

(72) Inventor: Cheng-Ge Cheng, Taipei (TW)

( * ) Notice: Subject to any disclaimer, the term of this patent is extended or adjusted under 35 U.S.C. 154(b) by 0 days.

(21) Appl. No.: 14/636,627

(22) Filed: Mar. 3, 2015

(65) Prior Publication Data

US 2015/0252942 A1 Sep. 10, 2015

(30) Foreign Application Priority Data

Mar. 5, 2014 (TW) ............................. 103107548 A

(51) Int. Cl.
*A47G 1/24* (2006.01)
*B60R 1/02* (2006.01)
*F16M 13/02* (2006.01)
*A47G 1/16* (2006.01)

(52) U.S. Cl.
CPC ........... *F16M 13/022* (2013.01); *A47G 1/1613* (2013.01)

(58) Field of Classification Search
CPC .................................................. A47G 1/1613
USPC .............. 248/466, 475.1, 476, 479, 486, 489, 248/495, 496, 220.22, 222.52, 223.31, 248/223.41, 224.7, 324
See application file for complete search history.

(56) References Cited

U.S. PATENT DOCUMENTS

| | | | | |
|---|---|---|---|---|
| 3,529,799 A * | 9/1970 | Schaefer | A47G 1/1613 248/496 |
| 3,861,639 A * | 1/1975 | Morrill | A47G 1/1606 248/489 |
| 4,262,874 A * | 4/1981 | Seigh | A47G 1/1646 248/467 |
| 4,314,685 A * | 2/1982 | Schwan | A47B 57/04 108/107 |
| 5,605,313 A * | 2/1997 | Erickson | A47G 1/1606 248/467 |
| 6,527,244 B1 * | 3/2003 | Kamenstein | A47G 1/164 248/466 |
| 7,654,500 B1 * | 2/2010 | Jump | A47G 1/164 248/476 |
| 8,141,838 B2 * | 3/2012 | Johnson | A47G 1/164 248/477 |
| 8,342,472 B2 * | 1/2013 | Gaudron | A47G 1/18 248/475.1 |
| 2007/0186384 A1 * | 8/2007 | Broehl | A47G 1/1613 16/355 |
| 2008/0134535 A1 | 6/2008 | Webb | |

FOREIGN PATENT DOCUMENTS

EP 2417879 A1 2/2012
EP 2417879 A1 * 2/2012 ............. A47G 7/044

OTHER PUBLICATIONS

European Patent Office, Office Action, issued on Jul. 7, 2015.

* cited by examiner

*Primary Examiner* — Terrell McKinnon
*Assistant Examiner* — Michael McDuffie
(74) *Attorney, Agent, or Firm* — Rabin & Berdo, P.C.

(57) ABSTRACT

A wall hanger includes a fastening member, a linking member including a top wall, a lateral wall, and a bottom wall, and a sleeving member. A first connecting portion is at the fastening member. A second connecting portion is at the top wall to connect with the first connecting portion. The lateral wall is extending vertically toward a first direction distant from the top wall and has first teeth. The bottom wall is extending toward the first direction from the lateral wall and is parallel to the top wall. The sleeving member includes a base member, a supporting wall standing on the base member, and an abutting wall extending from the supporting wall and parallel to the base member. A groove is defined by the base member, the supporting wall, and the abutting wall. The top surface of the abutting wall has second teeth.

8 Claims, 13 Drawing Sheets

WALL HANGER

CROSS-REFERENCES TO RELATED APPLICATIONS

This non-provisional application claims priority under 35 U.S.C. §119(a) on Patent Application No. 103107548 filed in Taiwan, R.O.C. on 2014 Mar. 5, the entire contents of which are hereby incorporated by reference.

BACKGROUND

1. Technical Field

The instant disclosure relates to a wall hanger, in particular, to a wall hanging device whose position is adjustable repeatedly after hanging on a wall.

2. Related Art

Some articles in domestics or offices, like clothes, paintings, LCD screens, etc. are stored or demonstrated by hanging on the wall, via wall hanging structures or hanging devices.

A conventional hanging device is merely provided for hanging an object, like a painting or a LCD screen, on the wall. Conventionally, an object is hanged on the wall via a hook configured on the wall. Accordingly, the object is engaged with the hook or the object is hanged by the hook through a rope or a string connecting to the object. However, the object cannot be secured properly or may even fall off when the string is broken due to the gravity.

In addition, if the object is provided for demonstration and has a greater surface area, when the object is to be hanged on the wall, the orientation of the object has to be taken into consideration to ensure the object can be hanged on the wall with the right viewing angle. Accordingly, when a painting or a LCD screen is to be hanged on the wall, the position of the painting or the LCD screen has to be adjusted repeatedly until the painting or the LCD screen is well positioned. Besides, assembling the conventional hanging device is inconvenient and complicated.

Alternatively, a hanging hole is defined at the back of the painting or the LCD screen, and a hook configured on the wall is mated with the hanging hole, so that the hook is engaged with the hanging hole. However, a user has to make a precise measurement for configuring the hook on the wall before hanging the object to the wall. Otherwise, if the hook is improperly configured on the wall, the object would be tilted. A conventional adjustable hanger is provided, however the adjustment of the hook may be performed in a single direction. Accordingly, the conventional adjustable hanger is insufficient for hanging objects properly.

SUMMARY

To address this, the instant disclosure provides a wall hanger comprising a fastening member, a linking member, and a sleeving member. The fastening member is approximately formed as plate shaped, and a first connecting portion is at one side of the fastening member. The linking member is approximately formed as disk shaped and comprises a top wall, a lateral wall, and a bottom wall. The top wall comprises a second connecting portion at the surface thereof to connect with the first connecting portion. The lateral wall is extending vertically toward a first direction distant from one side of the top wall, and the lateral wall has a plurality of first teeth. The bottom wall is extending toward the first direction from the end of the lateral wall, and the bottom wall is parallel to the top wall. The sleeving member comprises a base member, a supporting wall, and an abutting wall. The supporting wall is standing on the base member. The abutting wall is extending from an end portion of the supporting wall and parallel to the base member. A groove is defined by the base member, the supporting wall, and the abutting wall. The top surface of the abutting wall has a plurality of second teeth. The sleeving member is fitted over the bottom wall of the linking member via the groove, so that the second teeth are engaged with the first teeth.

Due to the off-centre configuration of the connecting portions, the wall hanger allows an object hanged thereon to be adjusted vertically and horizontally. Therefore, when two wall hangers are applied to hang on an object, the orientation of the object can be adjusted by adjusting the two wall hangers.

Detailed description of the characteristics and the advantages of the disclosure is shown in the following embodiments, the technical content and the implementation of the disclosure should be readily apparent to any person skilled in the art from the detailed description, and the purposes and the advantages of the disclosure should be readily understood by any person skilled in the art with reference to content, claims and drawings in the disclosure.

BRIEF DESCRIPTION OF THE DRAWINGS

The instant disclosure will become more fully understood from the detailed description given herein below for illustration only, and thus not limitative of the instant disclosure, wherein.

DETAILED DESCRIPTION

Figure 1:
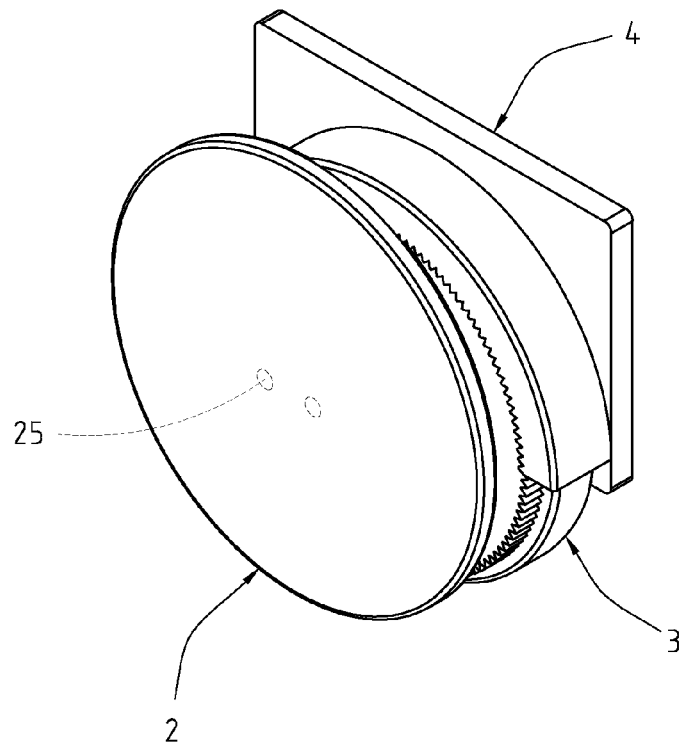
FIG. 1 illustrates a perspective view of a first embodiment of a wall hanger according to the instant disclosure.

Please refer to FIG. 1 to FIG. 4, illustrating a first embodiment of a wall hanger 1 according to the instant disclosure. As shown in FIG. 1, in this embodiment, the wall hanger 1 comprises a fastening member 2, a linking member 3, and a sleeving member 4.

Figure 2:
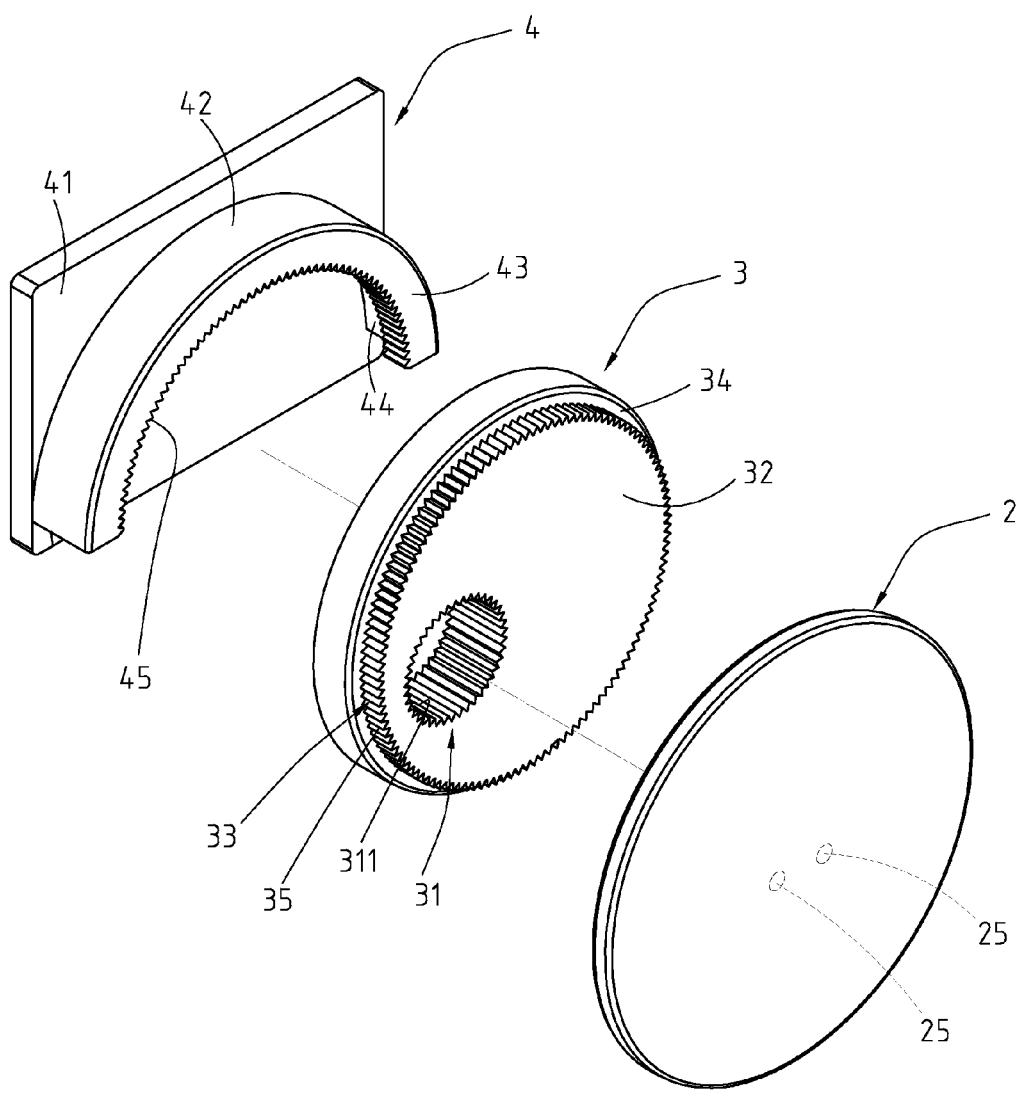
FIG. 2 illustrates an exploded view of the first embodiment of the wall hanger according to the instant disclosure, for one variation.
Figure 3:
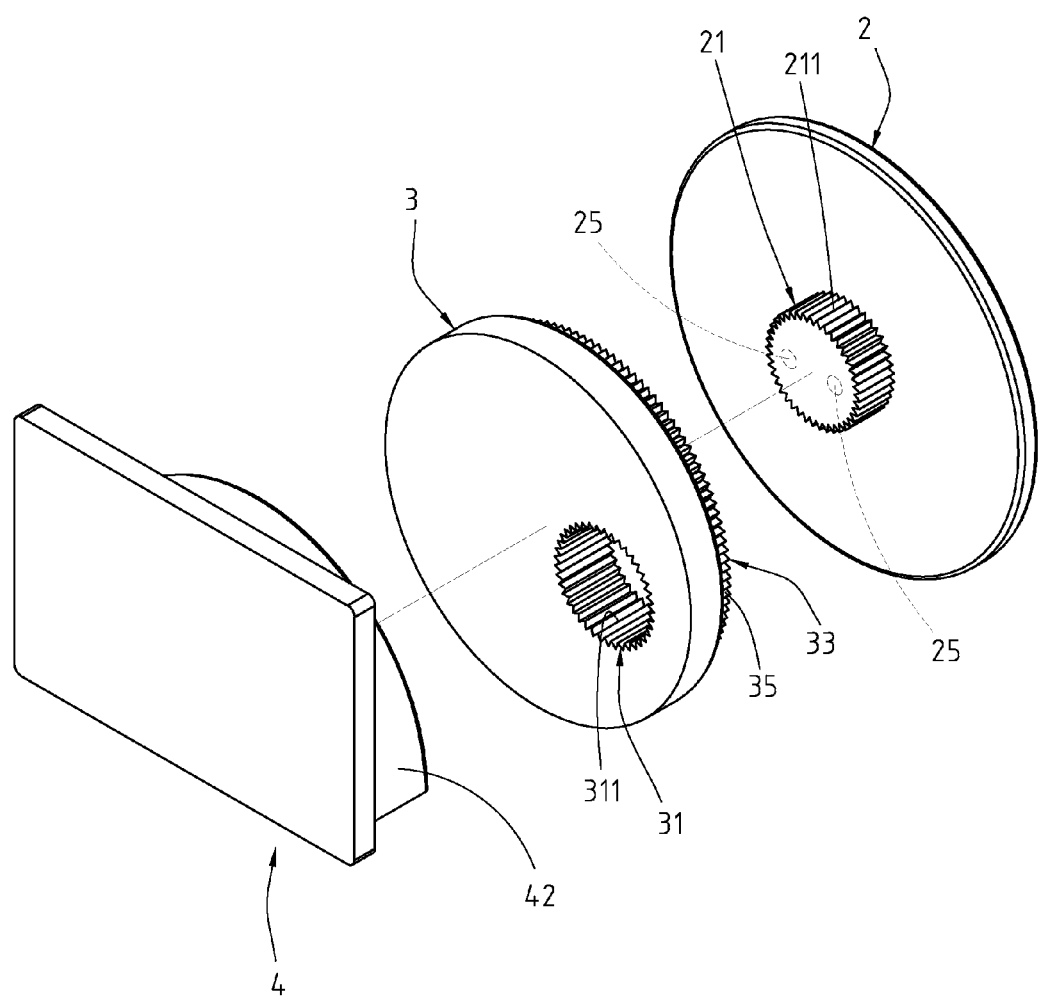
FIG. 3 illustrates an exploded view of the first embodiment of the wall hanger according to the instant disclosure, for another variation.
Figure 4:
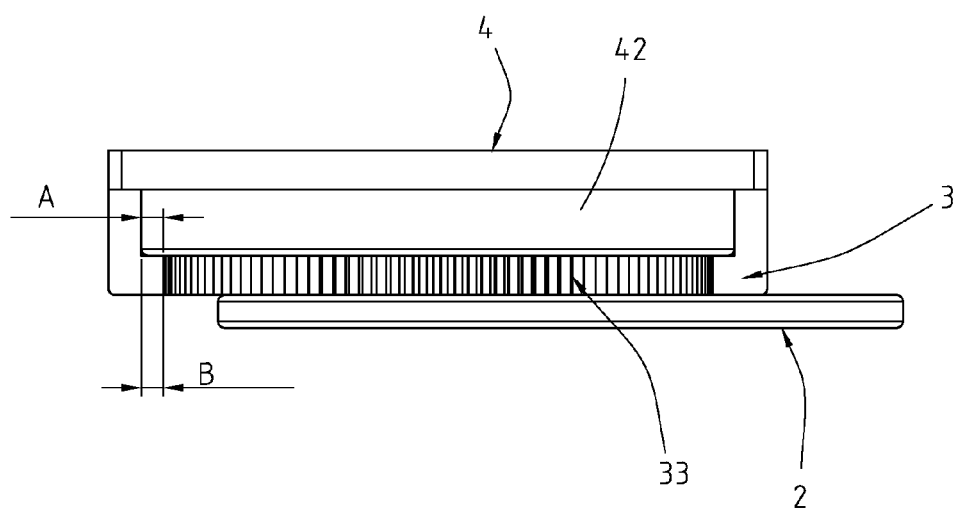
FIG. 4 illustrates a top view of the first embodiment of the wall hanger according to the instant disclosure.

As shown in FIG. 2 to FIG. 4, the fastening member 2 is approximately formed as plate shaped. Specifically, in this embodiment, the fastening member 2 is round, but embodiments are not limited thereto. A first connecting portion 21 is at a first side of the fastening member 2, and the first connecting portion 21 is at the center of the first side of the fastening member 2. In this embodiment, the fastening member 2 is formed as a round plate, and the first connecting portion 21 is at the center of the round plate. Specifically, in this embodiment, the first connecting portion 21 is a cylinder, and a plurality of third teeth 211 is at the lateral surface of the cylinder. The linking member 3 is approximately formed as disk shaped and comprises a top wall 32, a lateral wall 33, and a bottom wall 34. The lateral wall 33 is curved and is extending vertically toward a first direction distant from one side of the top wall 32 (that is, toward a direction away from the fastening member 2). A plurality of first teeth 35 is at of the lateral wall 33. The bottom wall 34 is extending toward the first direction from the end of the lateral wall 33. The bottom wall 34 is parallel to the top wall 32.

A second connecting portion 31 is at the surface of the top wall 32. The second connecting portion 31 is spaced from the center of the top wall 32 (that is, the second connecting portion 31 is off-centre). In this embodiment, the second connecting portion 31 is a round channel, and a plurality of fourth teeth 311 is at the inner wall of the round channel. Accordingly, the cylinder is securely mated with the round channel, and the third teeth 211 are engaged with the fourth teeth 311. Therefore, the fastening member 2 is fastened with the linking member 3 and not freely rotated relative to the linking member 3. In addition, at least one lock hole 25 is defined on the first connecting portion 21 of the fastening member 2, so that the fastening member 2 may be much securely connected with the sleeving member 4 via the locking hole 25 and a bolt.

In one embodiment, the number of the third teeth 211 is 360 and the number of the fourth teeth 311 is also 360. Accordingly, when the fastening member 2 is rotated relative to the linking member 3 by one tooth, the fastening member 2 is substantially rotated relative to the linking member 3 by one degree.

The sleeving member 4 comprises a base member 41, a supporting wall 42, and an abutting wall 43. The supporting wall 42 is standing on the base member 41. The abutting wall 43 is extending from an end portion of the supporting wall 42 and parallel to the base member 41. A groove 44 is defined by the base member 41, the supporting wall 42, and the abutting wall 43. A plurality of second teeth 45 is at the top surface of the abutting wall 43. The abutting wall 43 is curved to correspond to the lateral wall 33 of the linking member 3. Similarly, the bottom wall 34 is curved to correspond to the supporting wall 42. Accordingly, the bottom wall 34 of the linking member 3 is received in the groove 44 of the sleeving member 4. In other words, the sleeving member 4 is fitted over the bottom wall 34 of the linking member 3 via the groove 44. As shown in FIG. 4, the extension distance A of the lateral wall 33 of the linking member 3 is substantially equal to the extension distance B of the abutting wall 43 of the sleeving member 4. Based on this, the bottom wall 34 of the linking member 3 is mated with the groove 44 of the sleeving member 4, and the first teeth 35 of the linking member 3 are engaged with the second teeth 45 of the sleeving member 4. Accordingly, the linking member 3 is not freely rotated relative to the sleeving member 4 when the bottom wall 34 of the linking member 3 is received in the groove 44 of the sleeving member 4.

Figure 5:
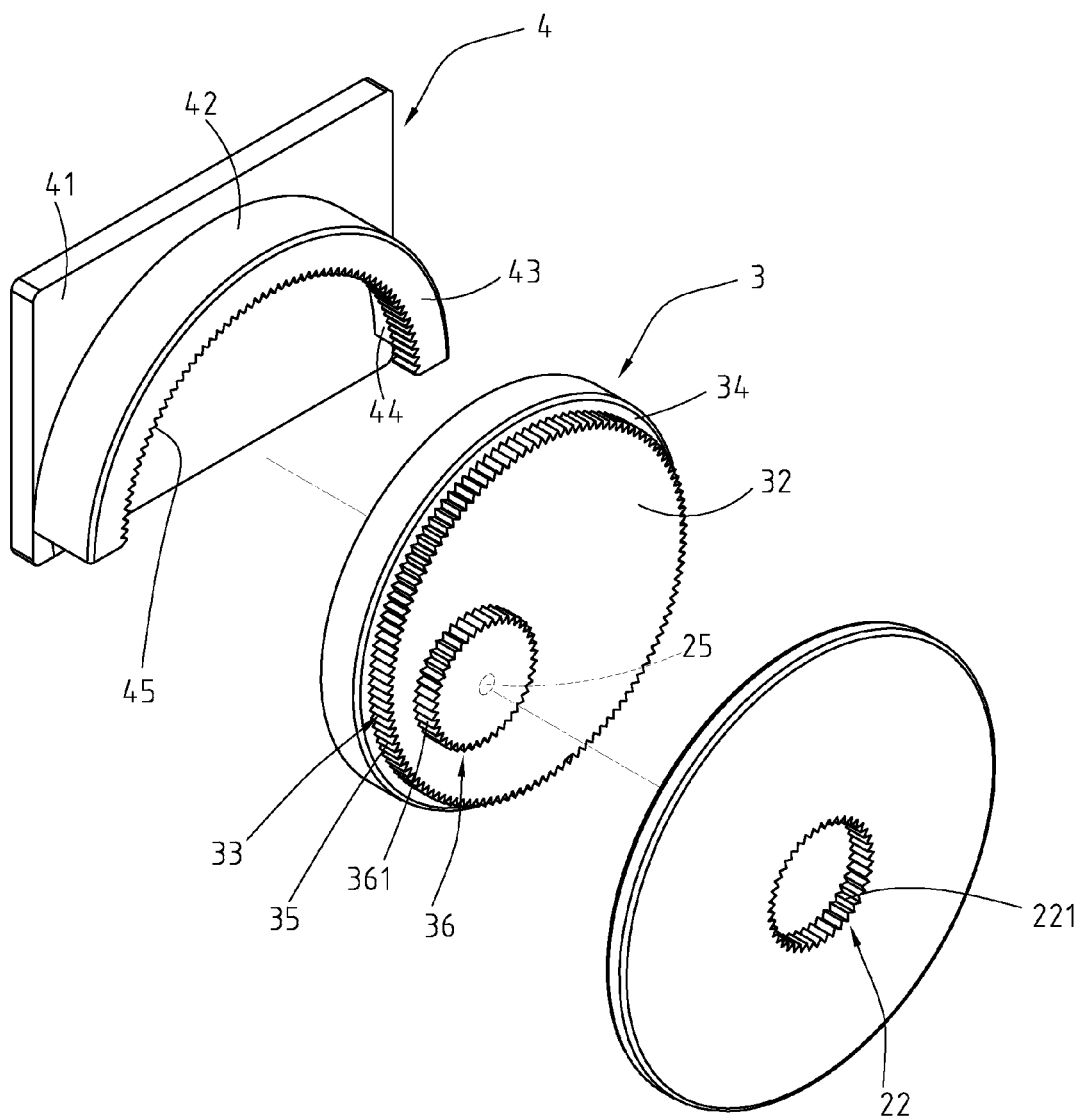
FIG. 5 illustrates an exploded view of a second embodiment of a wall hanger according to the instant disclosure.

Please refer to FIG. 5, illustrating a second embodiment of a wall hanger 1 according to the instant disclosure. Identical parts and structures are assigned the same reference numerals as in the first exemplary embodiment, with no further description will be given of these features. In this embodiment, the first connecting portion 22 of the fastening member 2 is a round channel, and a plurality of sixth teeth 221 is at the inner wall of the round channel. In addition, the second connecting portion 26 of the linking member 3 is a cylinder, and a plurality of fifth teeth 361 is at the lateral surface of the cylinder. Accordingly, the round channel is securely mated with the cylinder, and the fifth teeth 361 are engaged with the sixth teeth 221. Therefore, the fastening member 2 is fastened with the linking member 3 and not freely rotated relative to the linking member 3.

In one embodiment, the number of the fifth teeth 361 is 360 and the number of the sixth teeth 221 is also 360. Accordingly, when the fastening member 2 is rotated relative to the linking member 3 by one tooth, the fastening member 2 is substantially rotated relative to the linking member 3 by one degree.

Figure 6:
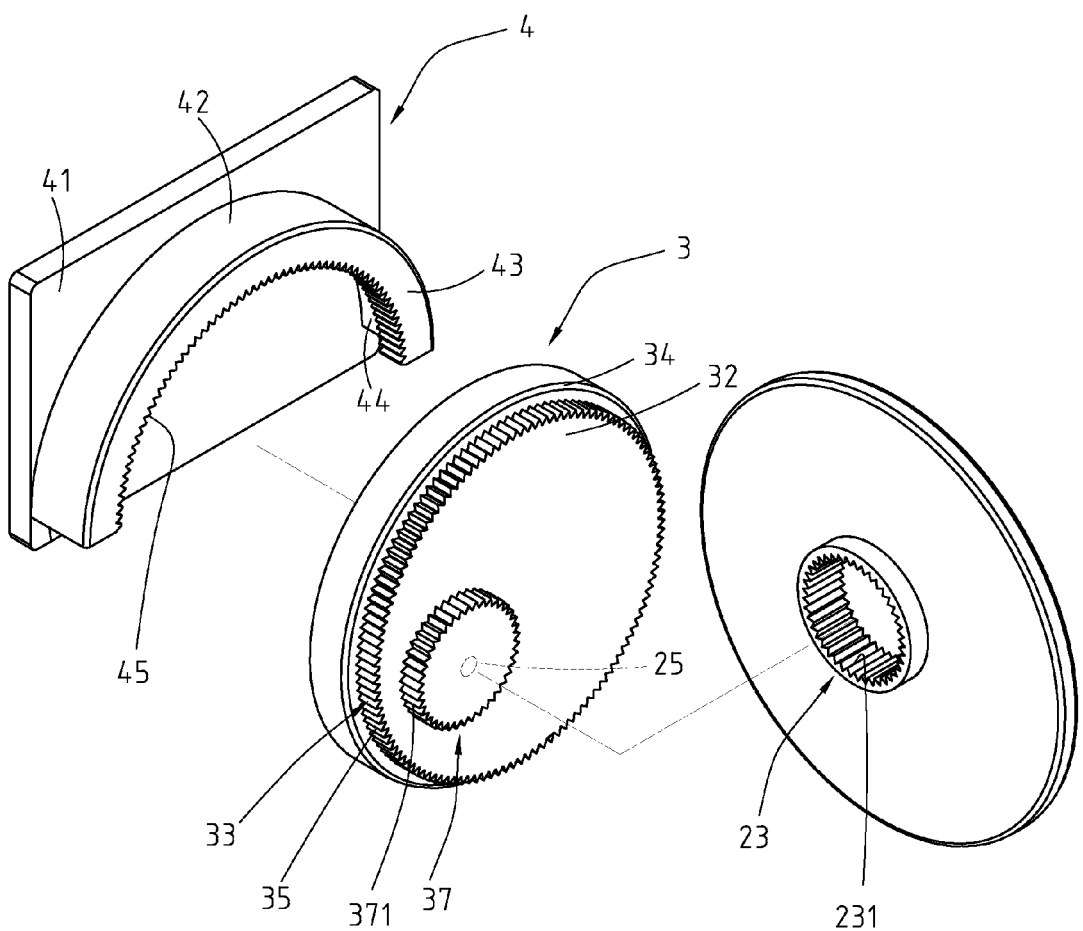
FIG. 6 illustrates an exploded view of a third embodiment of a wall hanger according to the instant disclosure.

Please refer to FIG. 6, illustrating a third embodiment of a wall hanger 1 according to the instant disclosure. Identical parts and structures are assigned the same reference numerals as in the first exemplary embodiment, with no further description will be given of these features. In this embodiment, the first connecting portion 23 is a tubular member, and a plurality of seventh teeth 231 is at the inner wall of the tubular member. In addition, the second connecting portion 27 is a cylinder, and a plurality of eighth teeth 371 is at the lateral surface of the cylinder. Accordingly, when the cylinder is inserted into the tubular member, the tubular member can be securely fitted over the cylinder, and the seventh teeth 231 are engaged with the eighth teeth 371. Therefore, the fastening member 2 is fastened with the linking member 3 and not freely rotated relative to the linking member 3.

In one embodiment, the number of the seventh teeth 231 is 360 and the number of the eighth teeth 371 is also 360. Accordingly, when the fastening member 2 is rotated relative to the linking member 3 by one tooth, the fastening member 2 is substantially rotated relative to the linking member 3 by one degree.

Figure 7:
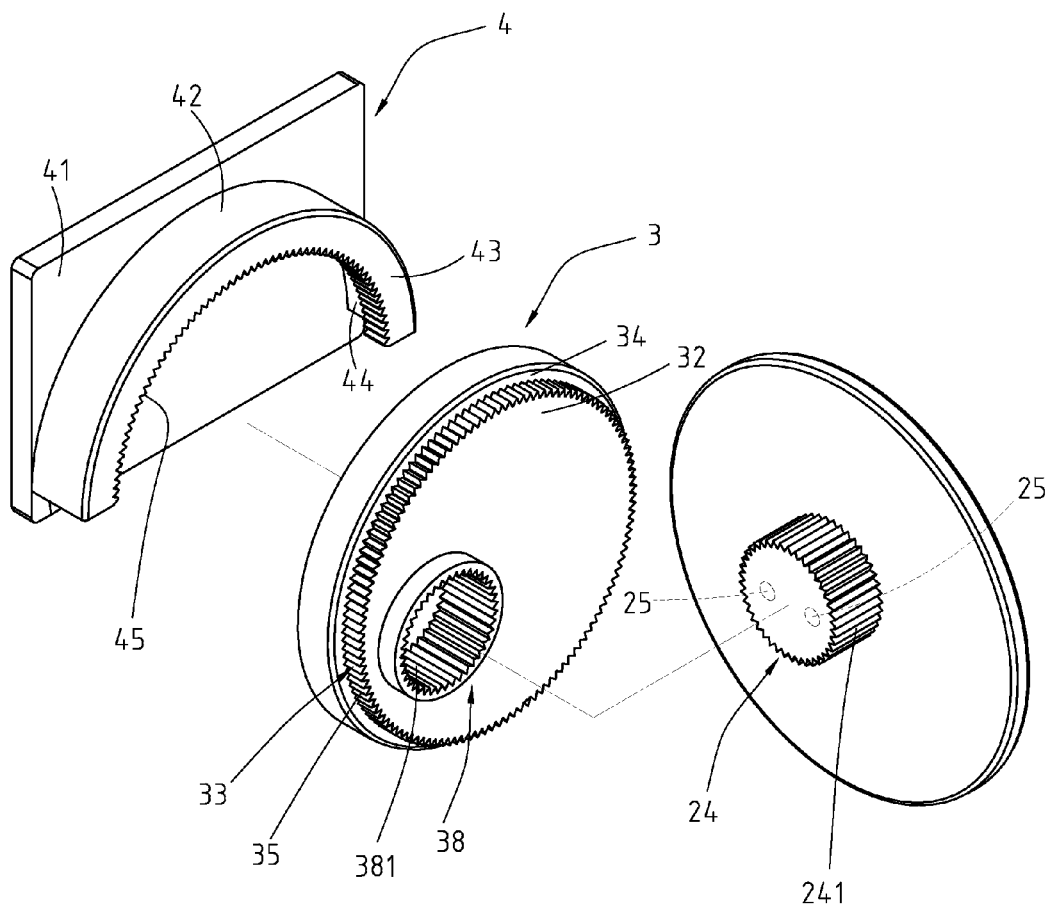
FIG. 7 illustrates an exploded view of a fourth embodiment of a wall hanger according to the instant disclosure.

Please refer to FIG. 7, illustrating a fourth embodiment of a wall hanger 1 according to the instant disclosure. Identical parts and structures are assigned the same reference numerals as in the first exemplary embodiment, with no further description will be given of these features. In this embodiment, the second connecting portion 38 is a tubular member, and a plurality of ninth teeth 381 is at the inner wall of the tubular member. In addition, the first connecting portion 24 is a cylinder, and a plurality of tenth teeth 241 is at the lateral surface of the cylinder. Accordingly, when the cylinder is inserted into the tubular member, the tubular member can be securely fitted over the cylinder, and the ninth teeth 381 are engaged with the tenth teeth 241. Therefore, the fastening member 2 is fastened with the linking member 3 and not freely rotated relative to the linking member 3.

In one embodiment, the number of the ninth teeth 381 is 360 and the number of the tenth teeth 241 is also 360. Accordingly, when the fastening member 2 is rotated relative to the linking member 3 by one tooth, the fastening member 2 is substantially rotated relative to the linking member 3 by one degree.

Figure 8:
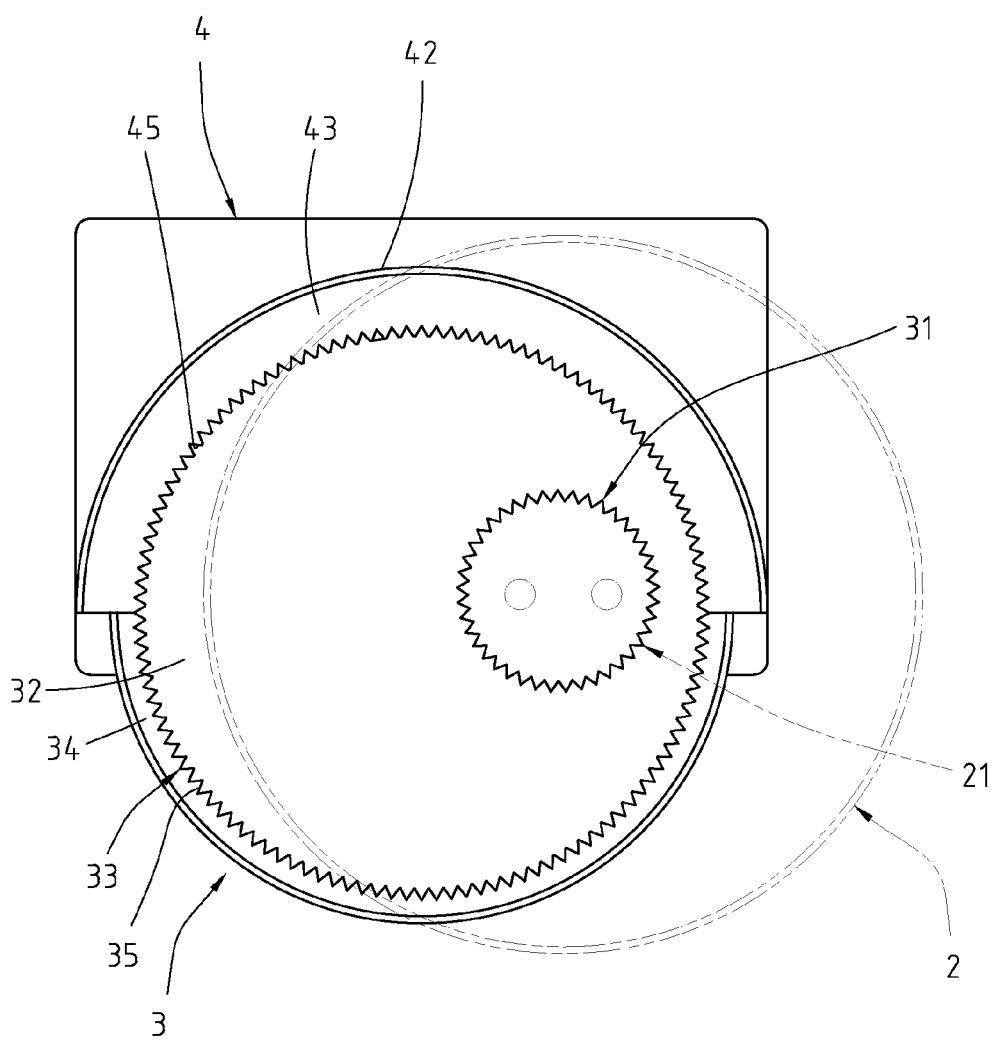
FIG. 8 to FIG. 10 illustrate schematic operational views of the first embodiment of the wall hanger according to the instant disclosure.
Figure 9:
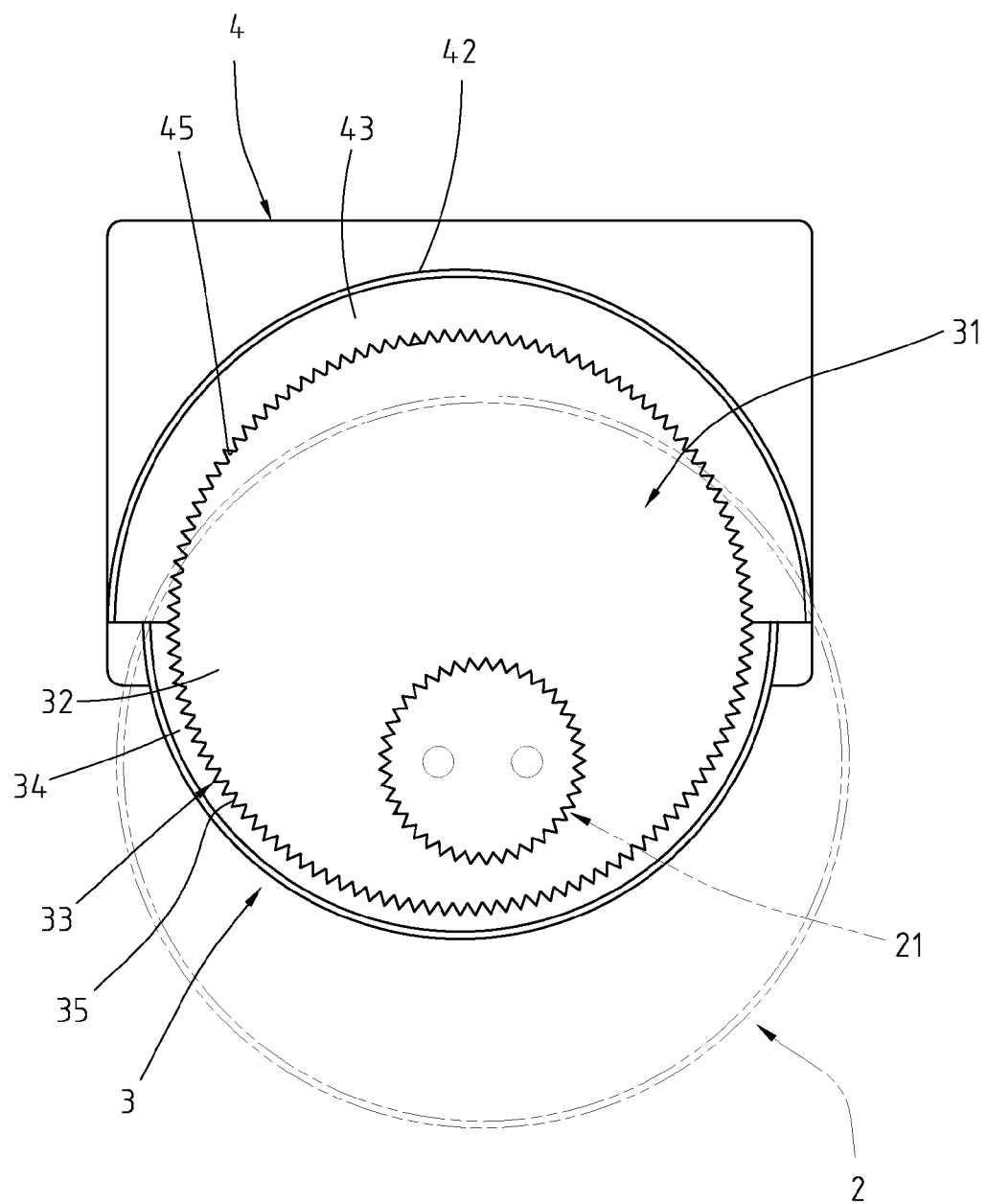
Figure 10:
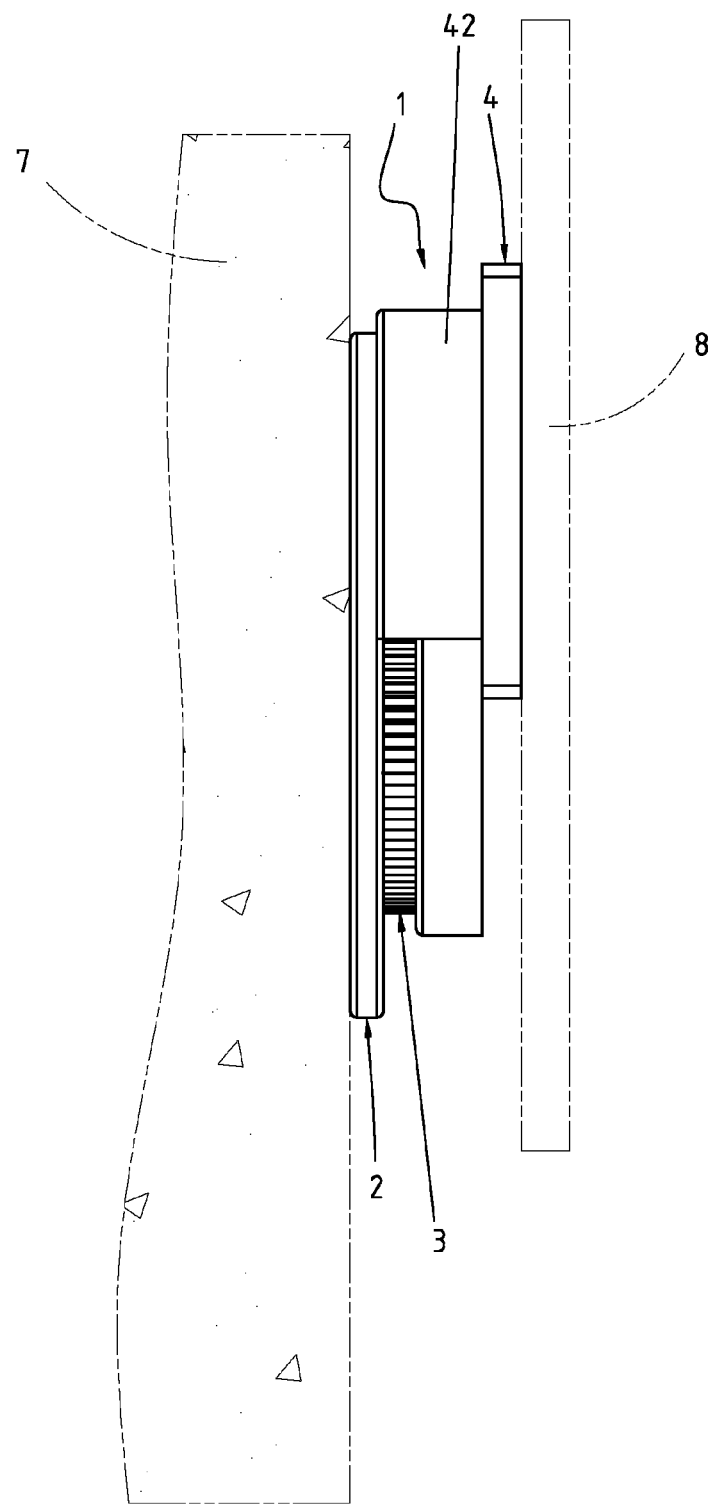

FIG. 8 to FIG. 10 illustrate schematic operational views of the first embodiment of the wall hanger 1 according to the instant disclosure. When the linking member 3 is to be securely with the sleeving member 4, the bottom wall 34 of the linking member 3 is engaged in the groove 44 of the sleeving member 4, and the first teeth 35 of the linking member 3 are engaged with the second teeth 45 of the sleeving member 4. As shown in FIG. 9, the linking member 3 can be rotated by a certain angle before the linking member 3 is engaged with the sleeving member 4. That is, the linking member 3 can be rotated relative to the sleeving member 4 by a maximum angle of 90 degrees.

As shown in FIG. 8 to FIG. 10, the first connecting portion 21, 22, 23, 24 of the fastening member 2 is mated with the second connecting portion 31, 36, 37, 38 of the linking member 3 and engaged with each other by the teeth. Therefore, when the fastening member 2 is to be rotated relative to the linking member 3, the fastening member 2 is firstly detached from the linking member 3. Then, the fastening member 2 is rotated by a certain angle and engaged with the linking member 3. Accordingly, the fastening member 2 can be rotated relative to the linking member 3 by a maximum angle of 360 degrees. As shown in FIG. 10, to hang a picture 8 on a wall 7, the sleeving member 4 may be, but not limited to, disposed on the wall 7, and the fastening member 2 may be, but not limited to, disposed on the back of the picture 8. Alternatively, the sleeving member 4 may be disposed on the back of the picture 8, and the fastening member 2 may be disposed on the wall 7.

Figure 11:
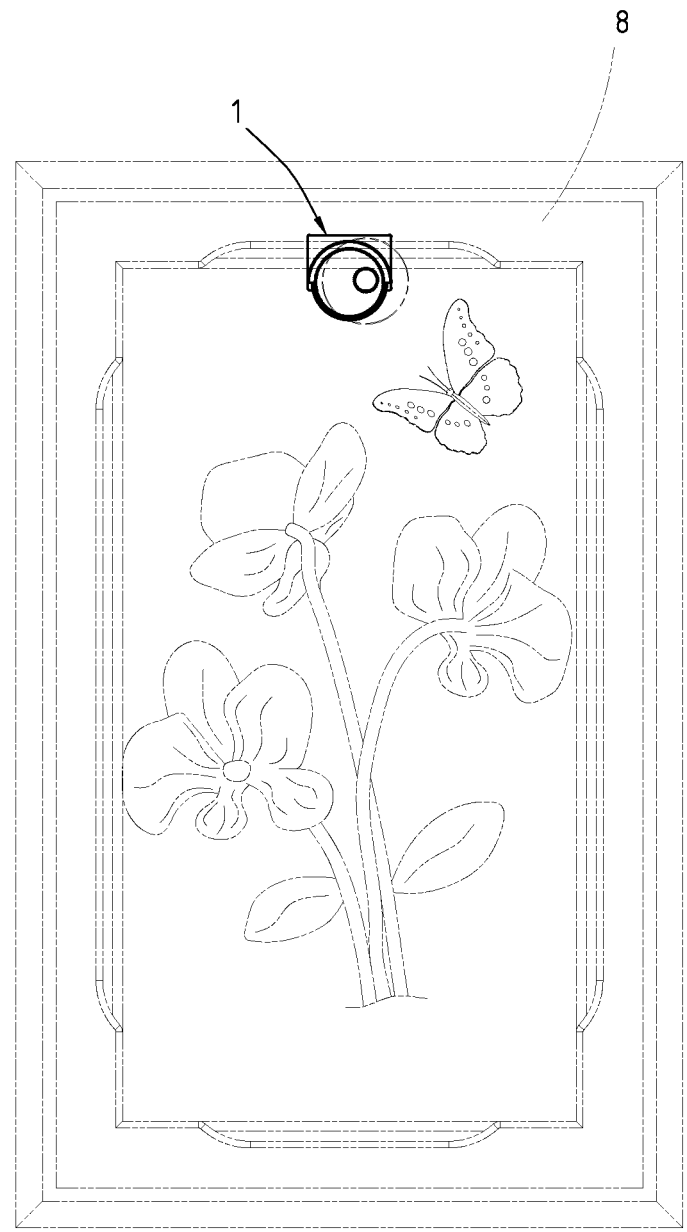
FIG. 11 illustrates one wall hanger is provided to hang an object.

FIG. 11 illustrates one wall hanger 1 is provided to hang an object (here, a picture 8). The wall hanger 1 is provided between the picture 8 and the wall 7. Specifically, the picture 8 and the wall 7 are connected via the fastening member 2, the linking member 3, and the sleeving member 4. The fastening member 2 may be secured to the wall 7, by means of gluing, locking, nailing, etc., and the sleeving member 4 is securely to the back of the picture 8. Accordingly, the orientation of the picture 8 can be adjusted effectively, and the picture 8 can be hanged on the wall regularly.

Figure 12:
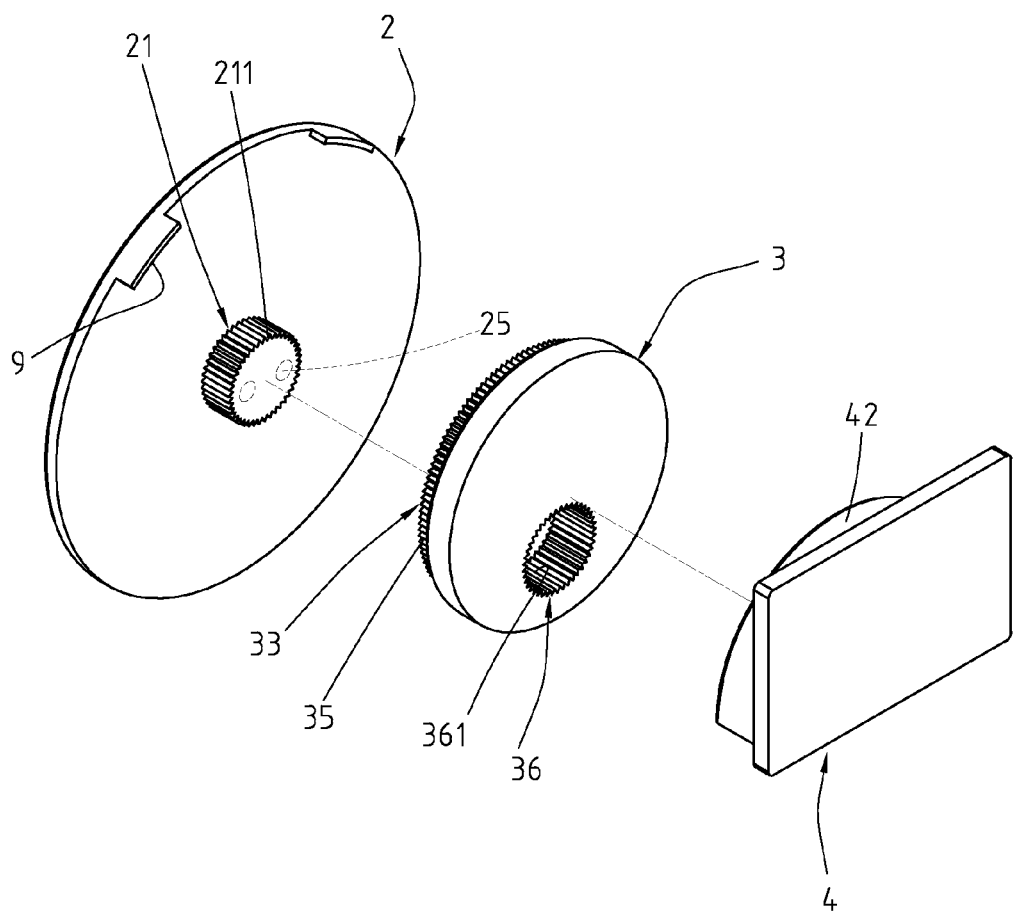
FIG. 12 illustrates an exploded view of a fifth embodiment of a wall hanger according to the instant disclosure.
Figure 13:
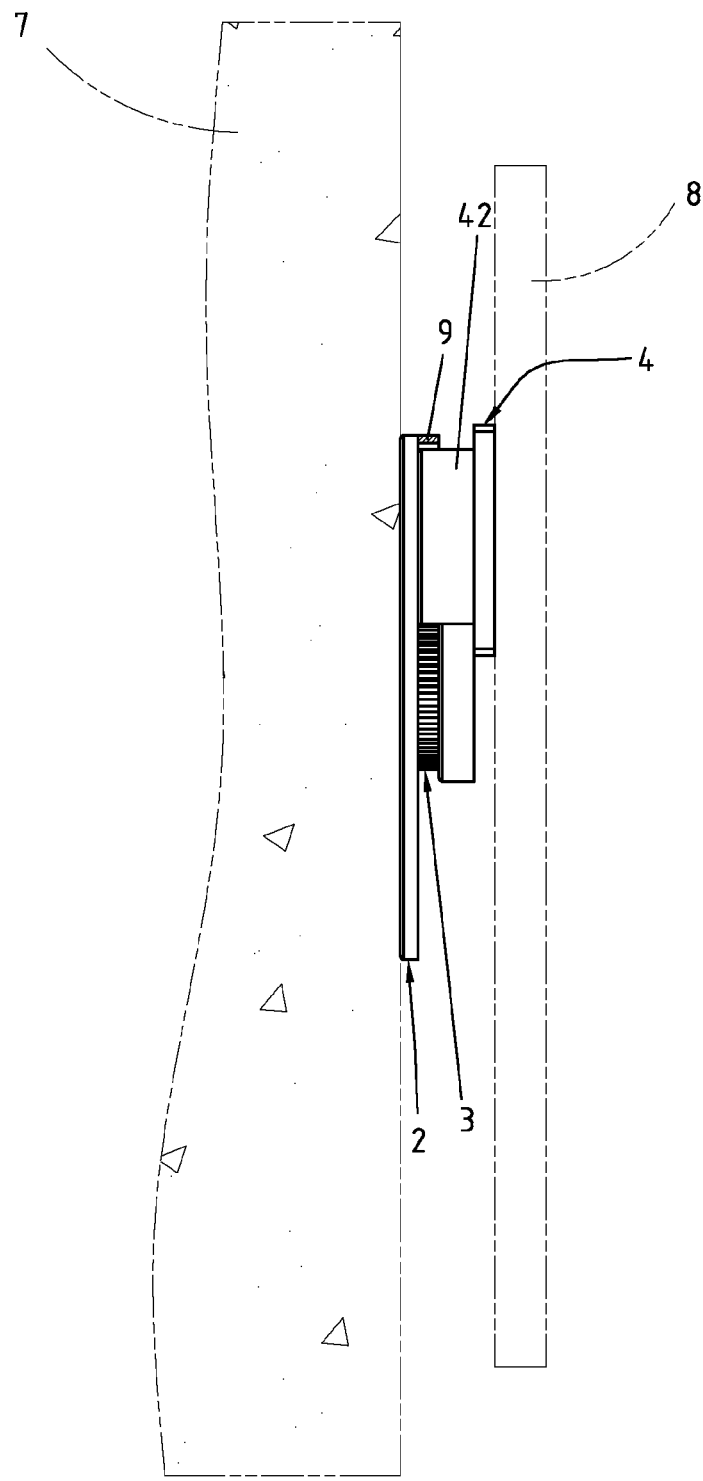
FIG. 13 illustrates a cross-sectional view of the fifth embodiment of the wall hanger according to the instant disclosure.

Please refer to FIG. 12 and FIG. 13. Illustrating a fifth embodiment of a wall hanger 1 according to the instant disclosure. A plurality of abutting sheets 9 is disposed at the edge of one side of the fastening member 2. In other words, the first connecting portion 21 and the abutting plates 9 are at the same side of the fastening member 2. Accordingly, when the supporting wall 42 of the sleeving member 4 is moved along an up direction shown in FIG. 13, the sleeving member 4 is not detached from the linking member 3 and the fastening member 2. Therefore, the connection between the components of the wall hanger 1 may be further improved. The abutting sheets 9 are spaced disposed at the fastening member 2, and a screw, an awl or a bar shaped object can be inserted into the gap between two adjacent abutting sheets 9 to detach the fastening member 2 from the linking member 3.

While the instant disclosure has been described by way of example and in terms of the preferred embodiments, it is to be understood that the invention needs not be limited to the disclosed embodiments. For anyone skilled in the art, various modifications and improvements within the spirit of the instant disclosure are covered under the scope of the instant disclosure. The covered scope of the instant disclosure is based on the appended claims.

What is claimed is:

1. A wall hanger, comprising:
a fastening member approximately formed as plate shaped, wherein a first connecting portion is at one side of the fastening member;
a linking member approximately formed as disk shaped, the linking member comprising:
a top wall, comprising a second connecting portion at the surface of the top wall to connect with the first connecting portion;
a lateral wall, extending vertically toward a first direction distant from one side of the top wall, wherein the lateral wall has a plurality of first teeth; and
a bottom wall, extending toward the first direction from the end of the lateral wall, wherein the bottom wall is parallel to the top wall; and
a sleeving member, comprising:
a base member;
a supporting wall, standing on the base member; and
an abutting wall, extending from an end portion of the supporting wall and parallel to the base member, wherein a groove is defined by the base member, the supporting wall, and the abutting wall, the top surface of the abutting wall has a plurality of second teeth, the sleeving member is fitted over the bottom wall of the linking member via the groove, so that the second teeth are engaged with the first teeth;
wherein the first connecting portion is at the center of the fastening member, and the second connecting portion is spaced from the center of the top wall of the linking member.

2. The wall hanger according to claim 1, wherein the first connecting portion is a cylinder, a plurality of third teeth is at the lateral surface of the cylinder, wherein the second connecting portion is a round channel, a plurality of fourth teeth is at the inner wall of the round channel, wherein when the cylinder is inserted into the round channel, the third teeth are engaged with the fourth teeth.

3. The wall hanger according to claim 1, wherein the second connecting portion is a cylinder, a plurality of fifth teeth is at the lateral surface of the cylinder, wherein the first connecting portion is a round channel, a plurality of sixth teeth is at the inner wall of the round channel, wherein when the cylinder is inserted into the round channel, the fifth teeth are engaged with the sixth teeth.

4. The wall hanger according to claim 1, wherein the first connecting portion is a tubular member, a plurality of seventh teeth is at the inner wall of the tubular member, wherein the second connecting portion is a cylinder, a plurality of eighth teeth is at the lateral surface of the cylinder, wherein when the tubular member is fitted over the cylinder, the seventh teeth are engaged with the eighth teeth.

5. The wall hanger according to claim 1, wherein the second connecting portion is a tubular member, a plurality of ninth teeth is at the inner wall of the tubular member, wherein the first connecting portion is a cylinder, a plurality of tenth teeth is at the lateral surface of the cylinder, wherein when the tubular member is fitted over the cylinder, the ninth teeth are engaged with the tenth teeth.

6. The wall hanger according to claim 1, wherein the extension distance of the lateral wall of the linking member is substantially equal to the extension distance of the abutting wall of the sleeving member.

7. The wall hanger according to claim 1, wherein the extension distance of the supporting wall of the sleeving member is larger than the thickness of the bottom wall of the linking member.

8. The wall hanger according to claim 1, wherein the fastening member further comprises a plurality of abutting sheets spacingly disposed at the edge of the fastening member.

* * * * *